Dec. 2, 1924.
M. M. HOLMES
1,517,838
ANIMAL AND POULTRY FEEDER
Filed Jan. 21, 1924 — 2 Sheets-Sheet 1
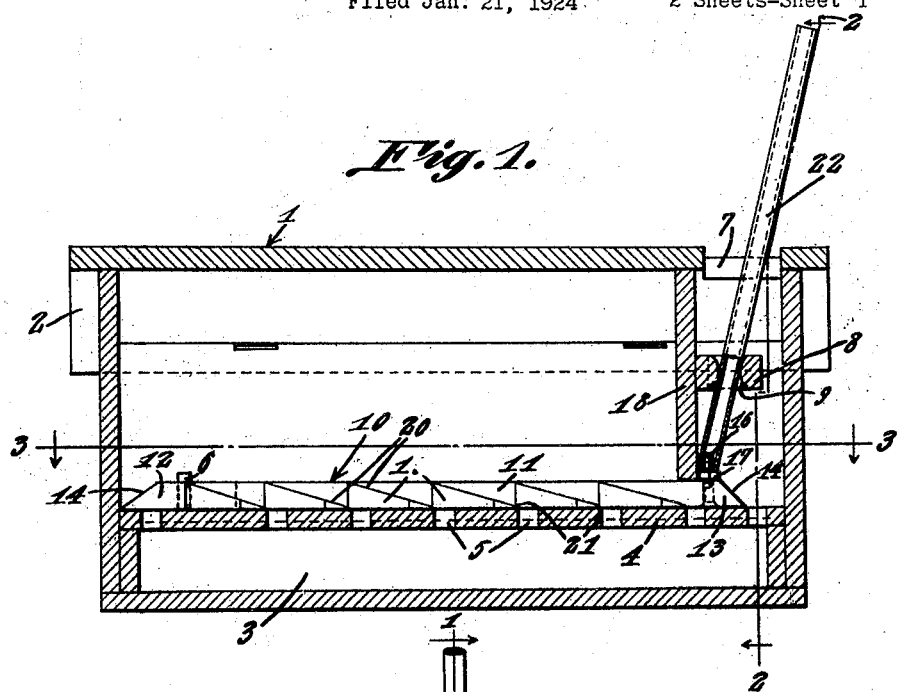
Fig. 1.
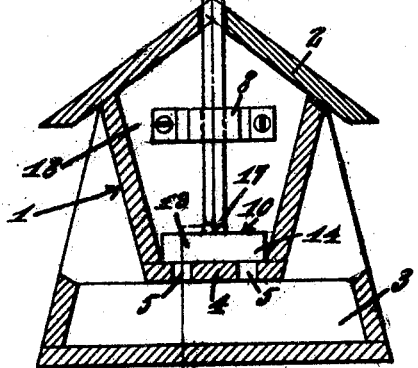
Fig. 2.
M. M. Holmes, Inventor

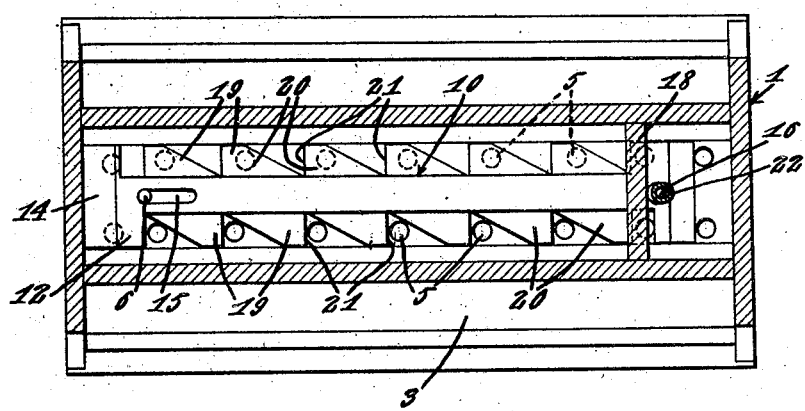

Patented Dec. 2, 1924.

1,517,838

UNITED STATES PATENT OFFICE.

MOSES M. HOLMES, OF TULSA, OKLAHOMA.

ANIMAL AND POULTRY FEEDER.

Application filed January 21, 1924. Serial No. 687,560.

*To all whom it may concern:*

Be it known that I, MOSES M. HOLMES, a citizen of the United States, residing at Tulsa, in the county of Tulsa and State of Oklahoma, have invented a new and useful Animal and Poultry Feeder, of which the following is a specification.

This invention relates to feeders for hogs, poultry and the like.

The object of the invention is to provide a feeder of this character equipped with simple and efficient means for discharging the feed from the hopper to the feeding trough and which is so constructed that any desired amount may be fed and the supply then cut off until the next feeding time.

Another object is to construct a feeder of this character in which the feed is raised and lowered during its discharge from the hopper thus keeping it loose and preventing its clogging the discharge openings.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a longitudinal section of a feeder constructed in accordance with this invention.

Fig. 2 is a transverse section taken on the line 2—2 of Fig. 1.

Fig. 3 is a horizontal section taken on the line 3—3 of Fig. 1; and

Fig. 4 is a detail perspective view of the feed discharging slide.

In the embodiment illustrated a feed hopper 1 is shown preferably having a gable roof one side 2 of which is hinged to afford access for filling, cleaning and the like. The bottom 4 of the hopper is provided with a plurality of feed discharge openings 5 which are normally closed by a slide 10 arranged in the hopper on the bottom 4.

A trough 3 is arranged under the hopper 1 and projects on each side thereof to afford access to the contents thereof so that the poultry or hogs to be fed may dip into the contents without interference by the hopper. The top of the hopper preferably projects over the troughs on either side to protect them against rain.

The slide 10 is constructed as shown in Fig. 4 comprising a body portion 11 having heads 12 and 13 at its ends said heads being inclined downwardly and outwardly as shown at 14. The body 11 of the slide has a longitudinally extending slot 15 preferably formed near one head thereof and through which an upstanding stud 6 on the hopper bottom 4 is designed to extend and which forms a guide for the slide during its reciprocatory movement. At the other end of the slide a bolt 16 projects upwardly and is equipped with a nut 17 said bolt being designed to form a connection for an operating handle 22 as shown in Fig. 1 and which is preferably made tubular to render it light and to adapt it to fit over the bolt 16.

Arranged on opposite sides of the body 11 of the slide are teeth 19 those on one side facing in a direction opposite to those on the other. These teeth have flat lower faces arranged flush with the bottom of the body 11 while their upper faces are inclined downwardly toward the front straight edges 21 of the teeth with shoulders 19$^a$ formed at the junction of the teeth with the body. It will thus be seen that the inclined faces 20 of the teeth at one side of the slide extend in one direction while those on the other side of the slide extend in the opposite direction so that when the slide is reciprocated in the hopper these teeth will operate to cut through and raise the feed during both movements of the slide thus insuring agitation of the feed, keeping it loose and preventing its clogging the openings 5.

A depending transverse partition 18 is arranged near one end of the hopper and spaced longitudinally from the end wall thereof terminating just above the slide 10. An apertured plate or keeper 8 extends laterally from the partition 18 into the space between the partition and the end wall of the hopper and is designed to form a fulcrum for the actuating lever 22, the walls of the opening in said plate being curved transversely as shown at 9 to provide for the rocking movement of the lever. The apex of the hopper top has an opening 7 therein through which the lever 22 projects and which positions it convenient for operation.

From the above description it will be obvious that the toothed slide 10 when mounted as shown in the drawings will be of a length slightly less than that of the hopper to provide for the reciprocatory movement of the slide over the openings 5 for covering and uncovering them by means of the teeth 19. These teeth are arranged as shown in Fig. 3 with the beveled front ends of one set arranged in advance of those of the other set so that during the reciprocatory movement of the slide the openings 5 on one side will be open as shown in Fig. 3 while those on the other side are closed. The reciprocatory movement of the slide is accomplished by rocking the lever 22 back and forth which motion raises and lowers the feed alternately and permits it to pass through the openings 5 which are uncovered. When the lever is in upright or neutral position both series of openings 5 will be substantially covered by the teeth 19 and thus practically cut off the supply of feed to the trough.

It is of course understood that this feeder may be made of any desired size according to the use for which it is intended it being made smaller when used for poultry than when used as a stock feeder.

The feeder is readily portable from place to place and the gist of the invention resides in the toothed slide 10 operable for agitating the feed at will thereby preventing hardening and clogging of the feed, and causing it to pass out to the trough.

I claim:—

1. In a feeder of the class described a container having openings in its bottom, and a toothed slide movable over said openings, the teeth of said slide having inclined upper faces to form agitators for the feed.

2. In a feeder of the class described a container having openings in its bottom, and a toothed slide movable over said openings, the teeth of said slide having their upper faces inclined downwardly toward one end.

3. In a feeder of the class described a container having openings in its bottom, and a toothed slide movable over said openings, the teeth of said slide having their upper faces inclined downwardly toward one end and provided with shoulders at their junction with the body of the slide.

4. A feed slide for feed hoppers comprising a body having beveled heads at its ends and a longitudinal slot intermediate said heads to receive a guide stud, saw teeth on opposite sides of said body, those on one side facing in a direction opposite to those on the other side.

5. A slide of the class described comprising a body having heads extending transversely across its opposite ends the upper faces of said heads being beveled downwardly and outwardly, teeth arranged along opposite sides of said body those on one side facing in a direction opposite to those on the other side and having cutting edges with the upper faces of the teeth inclined downwardly toward said cutting edges, the cutting edges of one set of teeth being arranged diagonally those of the other set.

In testimony that I claim the foregoing as my own, I have hereto affixed my signature in the presence of two witnesses.

MOSES M. HOLMES.

Witnesses:
B. A. EVERETT,
A. E. BERKMAN.